United States Patent [19]

Yamaguchi et al.

[11] 4,244,343
[45] Jan. 13, 1981

[54] THERMOSTATIC VALVE FOR COMPENSATING AIR FUEL MIXTURE FOR AIR TEMPERATURE CHANGE

[75] Inventors: Akihide Yamaguchi, Kariya; Hajime Akado, Anjo; Mitsuyoshi Teramura, Toyota, all of Japan

[73] Assignees: Nippondenso Co., Ltd., Kariya; Toyota Jidosha Kogyo Kabushiki Kaisha, Toyota, both of Japan

[21] Appl. No.: 12,702

[22] Filed: Feb. 16, 1979

[30] Foreign Application Priority Data

Feb. 20, 1978 [JP] Japan .................................. 53/20471

[51] Int. Cl.³ .......................................... F02M 31/00
[52] U.S. Cl. .................................... 123/556; 123/552; 236/13
[58] Field of Search ....................... 123/122 H, 122 D; 236/13

[56] References Cited

U.S. PATENT DOCUMENTS 4,112,896 9/1978 Akado .............................. 123/122 D Primary Examiner—Ronald H. Lazarus
Attorney, Agent, or Firm—Cushman, Darby & Cushman

[57] ABSTRACT

A thermostatic valve for compensating for the change in the intake air temperature of an internal combustion engine. The thermostatic valve has a temperature detector attached to a housing provided with a port in communication with atmosphere, a pipe in communication with a vacuum motor, a pipe in communication with the portion of the intake passage downstream from the throttle valve of carburetor and a pipe in communication with the float chamber of the carburetor and also with the air cleaner of the engine. A first valve element adapted to be operated by the temperature detector, and a second valve element adapted to be operated by the first valve element are disposed in the housing and are pressed against respective valve seats formed in the housing by means of springs. The introduction of vacuum in the intake passage into the vacuum motor for adjusting the intake air temperature is controlled in response to the change in the intake air temperature. At the same time, the shortage of intake air attributable to a rise of the intake air temperature is compensated by an additional supply of air which is made directly to the portion of the intake passage downstream from the throttle valve, upon detect of the rise of the intake air temperature.

6 Claims, 6 Drawing Figures

THERMOSTATIC VALVE FOR COMPENSATING AIR FUEL MIXTURE FOR AIR TEMPERATURE CHANGE

RELATED APPLICATION

References made to the related application of Akado, Ser. No. 921,566, filed July 3, 1978, now U.S. Pat. No. 4,178,898.

BACKGROUND OF THE INVENTION

The present invention relates to a thermostatic valve for compensating air fuel mixture for the change in the intake air temperature, so as to avoid disorder of internal combustion engine at specifically low and high ambient air temperature.

Conventionally, there has been proposed such a thermostatic valve for use in combination with the carburetor of an internal combustion engine as having both of a cold air compensation valve and a hot air compensation valve. More specifically, the cold air compensation valve is adapted to detect a specifically low intake air temperature, as in the winter season, and to transmit the vacuum established at the downstream side of the throttle valve to a vacuum motor which is adapted to mix warm air with the cold intake air, so as to raise the temperature of the air supplied to the carburetor. On the other hand, the hot air compensation valve is adapted to supply a compensating air to the intake passage, when the ambient air temperature is specifically high as in the summer season, in order to prevent the air fuel mixture from becoming excessively rich, particularly during the idling of the engine.

This type of thermostatic valve employs one or more bimetals. In order to effect a satisfactory control over a wide range of air temperature including specifically low and high temperatures, these bimetals must have an impractically large sizes. As a result, the weight and size of the thermostatic valve are inconventiently increased, resulting in a rise of the production cost. At the same time, the bimetals, which are subjected to the vibration caused by the engine, are likely to operate erroneously. Further, when the engine operates with a heavy load under a specifically low ambient air temperature, the vacuum in the intake air passage is lowered to such a level as can never actuate the vacuum motor for supplying warm air. Consequently, cold ambient air is induced into the carburetor to freeze the latter. At the same time, when the engine is stopped after a continuous running under a specifically hot ambient air temperature, as in the summer season, the temperature in the engine room is raised rapidly to cause an evaporation of the fuel in the float chamber of the carburetor. The fuel vapor is sucked into the carburetor to make the mixture excessively rich, so as to hinder the smooth running of the engine after restarting.

SUMMARY OF THE INVENTION

It is a major object of the invention to provide a thermostatic valve adapted to maintain a constant temperature of the intake air induced into the internal combustion engine, when the temperature of the ambient air is low, and to introduce the air from the float chamber of the carburetor and air cleaner of the engine into the intake passage, so as to maintain a constant air fuel ratio of mixture, when the temperature of the ambient air is high, thereby to prevent the disorder of the engine.

To this end, according to the invention, there is provided a thermostatic valve comprising a temperature detector having an operation shaft adapted to be actuated by a thermally expandable body; a housing having a first port communicating with the atmosphere, a second port communicating with a vacuum motor, a third port communicating with the float chamber of a carburetor and a fourth port communicating with the intake passage at the downstream side of the throttle valve of the carburetor; a first valve element disposed in the housing and adapted to be actuated by the detector; a second valve element disposed in the housing and adapted to be actuated by the first valve element; and a check valve disposed between the second port and the fourth port and adapted to allow a fluid to pass therethrough only in one direction. Further, a first passage intercommunicating the first and the second ports, a second passage intercommunicating the second and the fourth ports and a third passage intercommunicating the third and fourth ports are formed in the housing.

The first passage is adapted to be opened and closed by the first element, such that the communication between the atmosphere and the vacuum motor and the communication between the portion of the intake passage downstream from the throttle valve and the atmosphere are made and broken alternatingly.

The check valve disposed in the second passage is opened when the intake vacuum in the intake passage transmitted through the fourth passage is high, and is closed when the vacuum acting on the check valve is lower than the vacuum at the second port, thereby to make and break the communication between the vacuum motor and the portion of the intake passage downstream from the throttle valve.

The third passage is adapted to be opened and closed by the second valve element, so as to make and break the communication between the portion of the intake passage downstream from the throttle valve and the air supply source, i.e. the float chamber of the carburetor and the air cleaner.

DESCRIPTION OF THE PREFERRED EMBODIMENTS

Figure 1:
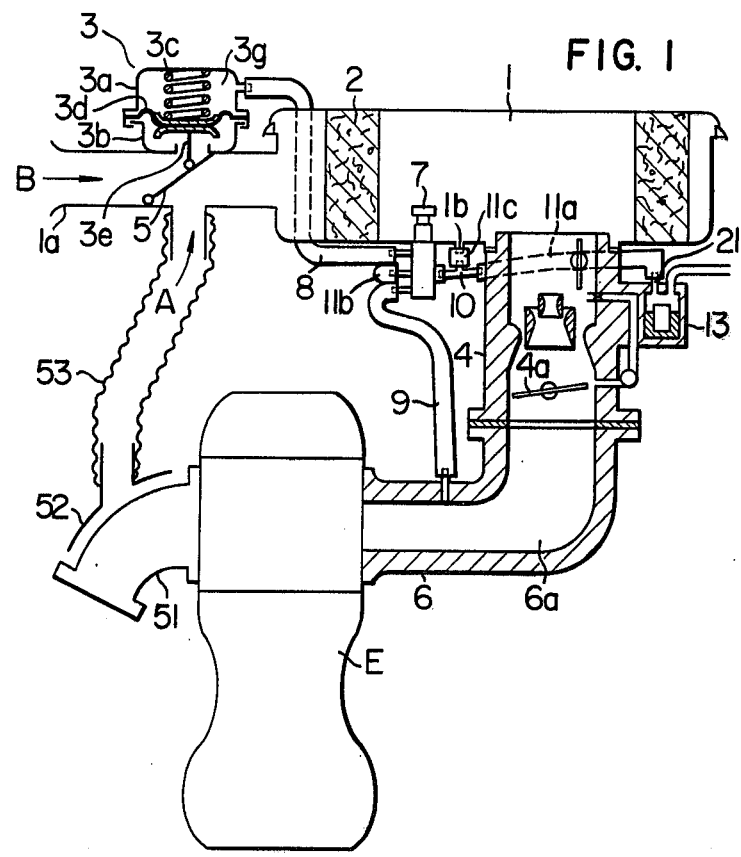
FIG. 1 shows schematically and partly in section an internal combustion engine equipped with a thermostatic valve in accordance with the invention.

Referring first to FIG. 1, an air cleaner and a filter element are designated, respectively, at reference numerals 1 and 2. A vacuum motor 3 is constituted by housings 3a, 3b made of a metal or a plastic, spring 3c, diaphragm 3d, rod member 3e and a vacuum chamber 3g. This vacuum motor 3 is adapted to effect the switching of the supply of warm air A and cold air B to the carburetor, as well as the adjustment of the mixing ratio of these airs, through an action of a change-over valve 5 disposed in the intake air passage 1a leading from the air cleaner 1. The vacuum motor 3 is controlled by means of a vacuum which is established in the intake passage at the downstream side 6a of the throttle valve and applied to the vacuum chamber 3g.

An intake pipe leading to the internal combustion engine E is designated at a numeral 6. The intake air A is heated by a heat collecting plate 52 which overlies an exhaust pipe 51, and then introduced into the intake passage 1a through a hose 53. A thermostatic valve embodying the invention is generally denoted by the reference numeral 7. The thermostatic valve of the invention is connected between the vacuum motor 3 and the intake passage 6a. Rubber hoses 8, 9, 11a, 11b and 11c are used for the connection of the thermostatic valve 7. More specifically, rubber hoses 8 and 9 are connected, respectively, to the vacuum motor 3 and the intake pipe 6. The rubber hose 11c is connected to a pipe 1b which is fixed to the portion of the air cleaner 1 inside of the filter element 2 by means of, for example, soldering. The rubber hoses 11a and 11b branches from a branch pipe 10 made of a metal or a plastic, and extends, respectively, to a float chamber 13 of the carburetor.

Figure 2:
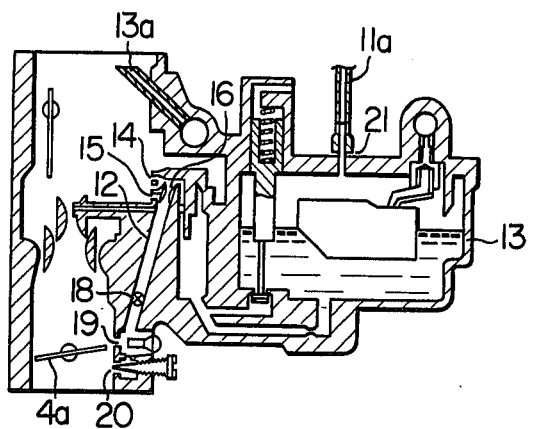
FIG. 2 is a sectional view showing in detail the construction of a carburetor attached to the engine as shown in FIG. 1.

The construction of the carburetor 4 is shown in more detail at FIG. 2 in which reference numerals 13 denotes, as mentioned above, the float chamber of the carburetor, while numerals 14 and 15 designate air bleeders. An economizer jet is denoted by numeral 16, while numeral 18 designates a solenoid valve which is energized and de-energized as the ignition switch of the engine is turned on and off, and is adapted to allow and cut off the supply of fuel. A low speed port 19 constitutes the outlet of a fuel passage 12 of a low speed fuel system, while an idle port is designated at a numeral 20. A pipe 21 opens in the upper space in the float chamber 13 is in communication with the thermostatic valve 7, through the hose 11a. The space in the float chamber 13 is communicated with the upstream side of the throttle valve 4a, through an air vent 13a, so that the air at the upstream side of the throttle valve 4a may be introduced into the float chamber 13.

The detail of construction of the thermostatic valve 7 will be understood from the following description.

Figure 3:
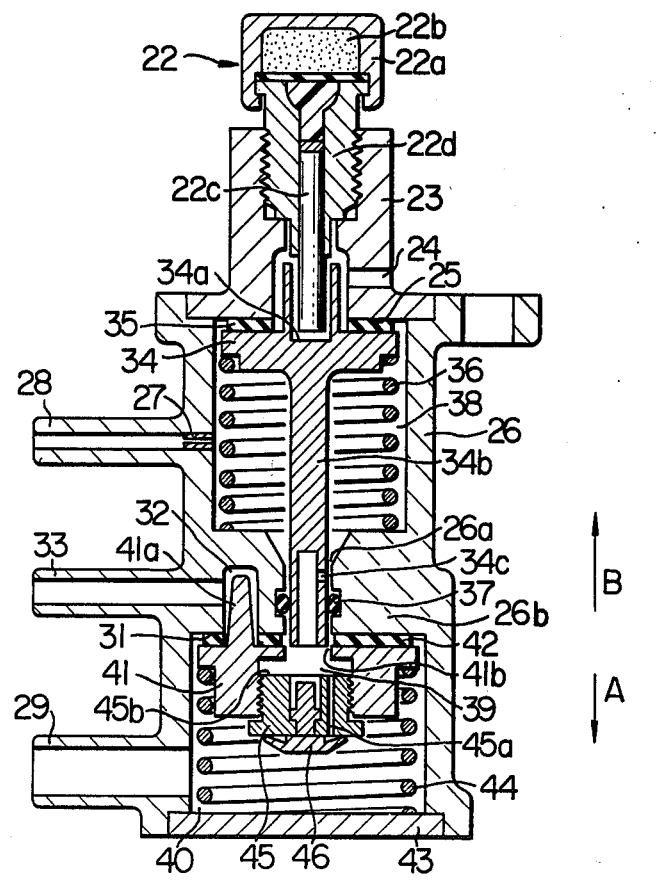
FIG. 3 is a front elevational sectional view of a thermostatic valve embodying the present invention.

Referring to FIG. 3, a heat conductive temperature sensing member 22a is made of a copper or the like metal having a good heat conductivity. A thermally expandable member 22b is made of a material the volume of which expands and shrinks in response to the ambient temperature, e.g. wax. An operation shaft 22c is accommodated by a housing 22d and adapted to be actuated by the thermally expandable body 22b. These members and parts in combination constitutes a temperature detector 22 which is fixed by screwing to an upper housing 23 made of duranex (commercial name) or a metal such as aluminum, iron or the like.

The upper housing 23 has in its side wall one or more ports 24 for communication with the ambient air, and a first valve seat surface 25 in its lower surface. A lower housing 26 is also made of a metal such as duranex, or a metal such as aluminum or iron. The upper and lower housings 23 and 26 in combination form the major outer profile of the thermostatic valve 7. The lower housing 26 is provided at its side wall with pipes 28 and 29. The pipe 28 is in communication with the vacuum chamber 3g of the vacuum motor 3 and has therein an orifice 27 of a small diameter of 0.7 $\phi$ or so, while the pipe 29 leads to the portion of the intake pipe 6 downstream from the throttle valve 4a of the carburetor 4. Further, a pipe 33, which is in communication with the pipe 21 of the float chamber 13 and with the pipe 1b of the air cleaner 1 is attached to the lower housing 26. This pipe 33 is in communication at its inner end with a port 32 which is formed in the vicinity of a second valve seat surface 31 provided on a central partition wall 26b formed in the lower housing 26.

A first valve element 34 made of duranex or a metal is covered at its peripheral portion of the upper surface with a gasket 35 made of, for example, silicone rubber and attached by baking. This first valve element 34 is disposed in the lower housing 26. This first valve element 34 is pressed and seated on the first valve seat surface 25 of the upper housing 23, through the gasket 35, by the force exerted by a spring 36.

This first valve element 34 is adapted to open and close a first passage through which the port 24 of the upper housing is communicated with the pipe 28 of the lower housing 26. In other words, this valve element 34 controls the introduction of atmospheric pressure into the vacuum chamber 3g of the vacuum motor 3.

The first valve element 34 is provided at its upper surface with a flattened portion 34a adapted to be contacted by the end of the operation shaft 22c of the temperature detector 22. Also, a hollow projection 34b, having an aperture 34c at its lower portion, extends downwardly from the lower surface of the first valve element 34. The periphery of the projection 34b of the first valve element 34 is sealed by means of an "O" ring 37 disposed in a central bore 26a of the lower housing 26. Consequently, the space 38 and the space 39 in the lower housing 26 are communicated with each other through the aperture 34c of the first valve element 34.

A second valve element 41 is also made of duranex or a metal such as aluminum, and is coated at the peripheral portion of its upper surface with a gasket 42 made of rubber or the like material. This gasket 42 is attached by baking or by means of an adhesive. This second valve element 41 has a tapered projection 41a and a through bore 41b which is large enough to receive the projection 34b of the first valve element 34. This second valve member 41 is disposed in the lower housing 26, in series relation to the first valve element 34, and is pressed against the second valve seat surface 31, through the gasket 42, by the force of a spring 44 which acts between the second valve element 41 and a lower cover 43 made of a plastic or a metal such as aluminum.

A partition 45 is made of duranex or a metal such as aluminum, and is provided with one or more bores 45a. An umbrella-shaped check valve 46 made of rubber is fitted to the partition 45. This check valve is installed so as to allow the flow of air only in the direction of arrow A.

This partition 45 is attached to the second valve element 41 such that the end of the projection 34b of the first valve element contacts a flat portion 45b of the partition 45. If the cross-sectional area of the annular gap formed between the through bore 26a of the lower housing 26 and the outer periphery of the projection 34b of first valve element 34 is equal to that of the aperture 34c of the first valve element 34, the "O" ring 37 and the aperture 34 can be dispensed with.

The thermostatic valve having the described construction operates in the manner explained hereinunder. When the ambient air temperature is low, as in the winter season, the temperature of the intake air is correspondingly low to incur a disorder of the internal combustion engine E. However, this problem is fairly avoided by the use of the thermostatic valve of the invention. Namely, when the ambient air temperature is low, the thermally expandable body 22b of the temperature detector 22 does not expand, so that the operation shaft 22c is not actuated.

Consequently, the first valve element 34 is kept in pressure contact with the first valve seat surface 25 of the upper housing 23, through the gasket 35, by the force of the spring 36. Therefore, the first passage through which the port 24 is communicated with the pipe 18 is kept closed. If the engine operates with a light load under this condition, the large vacuum established at the portion 6a of the intake passage acts on the check valve 46 to open the latter, through the pipe 29. Consequently, the second passage which includes the aperture 34c of the first valve element 34, bore 45a of the partition 45 and the pipe 29 is opened. As a result, the vacuum in the portion 6a of the intake passage is transmitted to the vacuum chamber 3g of the vacuum motor 3, so that the change-over valve 5 is moved to the position as shown in FIG. 1. On the other hand, when the engine operates with a heavy load under a low ambient air temperature with the supply of warm air A, the vacuum is lowered at the portion 6a of the intake passage. Since this vacuum is smaller than the vacuum in the pipe 28, the check valve 46, which has been opened, is closed, so that the vacuum which has been applied to the vacuum chamber 3g of the vacuum motor 3 is maintained, and the change-over valve 5 is held at the position as shown in FIG. 1. Since in this state the warm air A which has been warmed by the exhaust pipe 51 and introduced through the heat collecting plate 52 and the hose 53 is induced into the engine E, the temperature around the thermostatic valve 7 disposed in the air cleaner 1 is raised.

As the temperature around the thermostatic valve 7 is raised above, for example, 25° C., the thermally expandable body 22b of the temperature detector 22 is expanded to actuate the operation shaft 22c which in turn acts on the flattened portion 34a in the recess of upper surface of the first valve element 34, so as to depress the latter in the direction of arrow A. As a result, the first valve element 34 is moved downward away from the first valve seat surface 25, so that the first passage is opened. Consequently, the vacuum chamber 3g of the vacuum motor 3 is opened to the atmosphere, to make the vacuum motor 3 inoperative. In this state, whole of the intake air induced into the engine E is constituted by the cold air B. This in turn causes the temperature around the thermostatic valve 7 to drop, so as to make the thermally expandable body 22b shrink, thereby to allow the first valve element 34 to be seated again on the first valve seat surface 25. The intake air temperature is maintained within a predetermined range, due to a repetition of the above explained opening and closing of the first valve element. When the ambient temperature is higher than, for example, 25° C., the atmospheric air is introduced into the portion 6a of the intake passage through the aperture 34c of the first valve element 34, bore 45a of the check valve 45 and the pipe 29.

When the ambient air temperature is further raised up to 65° C. or higher, for example, the thermally expandable body 22b is further expanded to increase the stroke of the operation shaft 22c to such an extent as to position the aperture 34c in the projection 34b of the first valve element 34 below the "O" ring 37, and to depress the second valve element 41 in the direction of the arrow A. Consequently, the second valve element 41 is moved away from the second valve seat surface 31, so as to open the third through which the pipe 33 communicating with the float chamber 13 and the pipe 1b of the air cleaner 1 is communicated with the pipe 29 via the port 32 and the space 40. Consequently, the air in the float chamber 13 and the air in the air cleaner 1 are introduced to the downstream side of the throttle valve 4a of the carburetor 4, so that the fuel vapor in the float chamber 13 under high temperature is diminished. At the same time, the shortage of the intake air induced into the engine E attributable to the rise of the ambient air temperature is compensated by the air which is induced from the air cleaner 1 through the pipe 33. In order that the compensation air may not rush into the engine, the projection 41a of the second valve element 41 is tapered as illustrated.

As the temperature of the intake air is lowered due to a stop of engine operation or due to the reduction of the ambient air temperature, the thermally expandable body 22b of the temperature detector 22 is made to shrink to allow the second valve element 41 to be pushed back in the direction of arrow B by the force of the spring 44, into airtight contact with the second valve seat surface 31, thereby to cut the third passage. Consequently, the air supply from the float chamber 13 and the air cleaner 1 into the downstream portion of the carburetor 4 is interrupted. As the ambient temperature further comes down, the first valve element 34 is pushed back by the force of the spring 36 in the direction of the arrow B, into airtight contact with the first valve seat surface 25, thereby to cut the first passage and close the second passage. Consequently, the thermostatic valve is reset to the starting condition.

Figure 4:
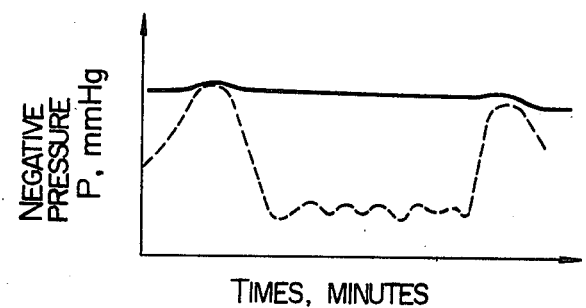
FIGS. 4 to 6 are characteristic charts for explaining the operation and advantages of the thermostatic valve of the invention.
Figure 5:
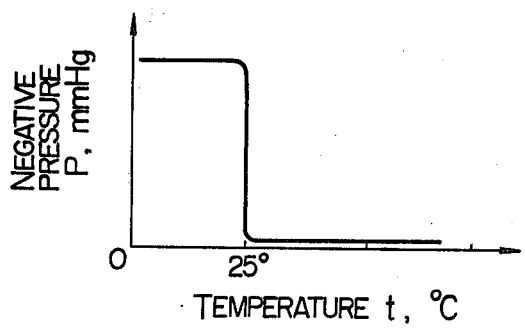
Figure 6:
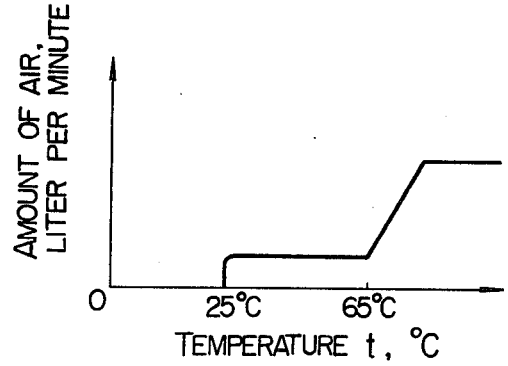

Characteristics of the thermostatic valve 7 of this embodiment are shown in FIGS. 4 to 6. Referring first to FIG. 4 in which the vacuum in the vacuum chamber 3g of the vacuum motor 3 and the vacuum in the portion 6a of the intake passage are shown in a full-line curve and a broken-line curve, respectively, the level of the vacuum in the vacuum chamber 3g is maintained substantially constant, irrespective of the time S, in spite of the change in the vacuum at the portion 6a of the intake passage. FIG. 5 is a characteristic chart showing the relation between the temperature t of the intake air included into the engine E and the vacuum p applied to the vacuum motor 3, obtained when the vacuum at the portion 6a of the intake passage is maintained constant (450 mmHg), while FIG. 6 is a characteristic chart showing the relation between the temperature t of the intake air supplied to the engine and the amount of the air Q supplied to the portion 6a of the intake passage, obtained when the vacuum at that portion 6a of the intake passage is maintained constant (450 mmHg). The characteristics as shown in FIGS. 5 and 6 correspond to each other.

In the described embodiment, the air in the air cleaner 1 is supplied to the portion 6a of the intake passage downstream from the throttle valve 4a of the carburetor 4, through the pipe 29, as the second valve element 41 is opened. This arrangement, however, is not exclusive. For instance, the arrangement may be such that the projection 34b of the first valve element 34 is tapered while the "O" ring 37 is eliminated. Then, an annular gap is preserved between the tapered projection 34b and the surface of the central through bore 26a in the central partition 26b of the lower flange 26, so that the atmospheric air coming from the port 24 of the upper housing 23 is introduced to the pipe 29, through the above-mentioned annular gap, as the second valve element 41 is opened.

In the described embodiment, the temperature of air in the air cleaner 1 is detected as the temperature of the intake air supplied to the engine E. However, it is possible to use the engine room temperature as the intake air temperature.

As has been stated, according to the invention, there is provided a thermostatic valve having the following features. Namely, the thermostatic valve of the invention has a housing provided with a first port communicating with atmosphere, a second port communicating with the vacuum motor, a third port communicating with the float chamber of the carburetor and a fourth port communicating with the intake passage at a portion downstream from the throttle valve of the carburetor. A temperature detector having an operation shaft adapted to be actuated by a thermally expandable body which expands and shrinks depending on the temperature is attached to the housing. A first valve element adapted to be operated by the operation shaft and a second valve element disposed in series to the first valve element are mounted in the housing. Also, a check valve is disposed in the housing, so as to make and break the communication between the second and the fourth ports. This check valve is adapted to be opened when the intake vacuum acting on this check valve is high, thereby to complete the communication of a second passage through which the second and the fourth ports are communicated with each other. This check valve is closed, when the vacuum acting on this check valve comes down below the level of the vacuum at the second port, thereby to interrupt the communication of the second passage. The first valve element is adapted to open and close a first passage through which the first and the second ports are communicated with each other, while the second valve element is adapted to open and close a third passage through which the third and the fourth ports are communicated with each other. When the intake air temperature is low, the first and the second valve elements are seated on their valve seats, so as to close the first and the third passages. As the intake air temperature rises, the first valve element is opened to complete the communication of the first passage, so as to allow the supply of air which comes from atmosphere or other air source from the first port to the fourth port. Subsequently, the second valve element is opened to complete the communication of the third passage, and the air available at the first port, which has been supplied from atmosphere or other air source, is fed to the fourth port.

It is remarkable that the complicated controls of the vacuum motor for adjusting the intake air temperature during running at a low ambient temperature, and of the compensation for the shortage of the intake air during running at high ambient air temperature through the supply of additional air are successfully performed by a thermostatic valve having a relatively simple construction constituted by small number of major parts such as the temperature detector, valve elements, housing, check valve and so forth. At the same time, the valve elements are actuated simply and directly by the operation shaft of the temperature detector.

Thus, the present invention provides a small-sized thermostatic valve which can be produced at a low cost of production.

In addition, in the thermostatic valve of the invention, the check valve is accommodated by the housing. This check valve offers the following advantage. If the load on the engine is increased during running at a low intake air temperature, the vacuum in the intake passage is lowered due to the opening of the throttle valve, down to such an extent as to make the vacuum motor inoperative. Consequently, intake air of the low temperature is inconveniently introduced into the carburetor to freeze the latter. However, this problem is avoided because the check valve of the invention conveniently closes the vacuum passage, so as to maintain the required level of vacuum acting on the vacuum motor.

Further, according to the invention, the second valve element is opened when the intake air temperature is specifically high, so as to allow the float chamber of the carburetor to communicate with the downstream side of the throttle valve, through the third and the fourth ports. At the same time, the air coming from atmosphere or other air source is supplied to the intake passage through the first and the fourth ports. Consequently, the undesirable formation of excessively rich mixture, which may for otherwise take place when the engine is restarted after a continuous heavy load operation at high temperature, due to the fuel vapor filling the float chamber of carburetor and sucked into the carburetor, is fairly avoided. At the same time, excessive enriching of the mixture in the intake passage due to the material reduction of amount of intake air is also prevented.

Thus, the thermostatic valve of the invention ensures smooth operation of the engine over a wide range of intake air temperature.

What is claimed is:

1. In an internal combustion engine having:
   a carburetor supplying an air fuel mixture to said engine through an intake pipe, said carburetor having a float chamber for storing fuel and a throttle valve for adjusting amount of air flow, and an air cleaner connected at the upstream side of said carburetor and supplying the air to said carburetor through a filter element, said air cleaner having an intake air passage to introduce the air from atmosphere, and a temperature responsive system comprising:
   a change-over valve pivotally mounted in said intake air passage adjacent to an aperture formed in said intake air passage for closing and opening the same, a vacuum motor mounted on said intake air passage and having a vacuum chamber and a movable diaphragm responding the vacuum applied to said chamber, said diaphragm being connected to said change-over valve so that said change-over valve is actuated to close and open said aperture in response to the movement of said diaphragm, a conduit connected to said aperture at one end and opening to a portion of an exhaust pipe so as to introduce warmed air around said exhaust pipe into said air cleaner when said aperture is opened, and a thermostatic valve mounted in said air cleaner for changing over a plurality of passages in response to temperature of intake air;
   said thermostatic valve comprising:
   a temperature detector having a thermally expandable member adapted to expand and shrink in response to the temperature of said intake air and an operation shaft adapted to be actuated by said thermally expandable member;
   a housing to which said temperature detector is attached, said housing having a first port communicating with the atmosphere, a second port communicating with said vacuum motor, a third port communicating with the float chamber of said carburetor and a fourth port communicating with said intake passage, and having a first passage intercommunicating said first and second ports, a second passage intercommunicating said second and fourth ports, and a third passage intercommunicating with third and fourth ports;

a first valve element disposed in said housing and adapted to be operated by said operation shaft of said temperature detector, said first valve element being movably disposed to be opened and closed said first passage;

a first spring means disposed in said housing and urging said first valve element in a closing direction;

a second valve element disposed in said housing and adapted to be operated by said first valve element, said second valve element being movably disposed to be opened and closed said third passage;

a second spring means disposed in said housing and urging said second valve element in a closing direction;

a check valve disposed in said second passage, said check valve opening said second passage when a vacuum introduced from said fourth port is higher than the vacuum introduced from said second port and permitting transmission of the vacuum from said fourth port to said second port, whereby, when the temperature of said intake air is low, said first and second valve elements are moved to the closing positions so as to close said first and third passages, while, when the temperature of said intake air is raised, said first valve element is moved to the opening position to open said first passage so that air from atmosphere or other air source is supplied to said fourth port through said first port, whereas, when the temperature of said intake air is further increased, said second valve element is moved by said first valve element to the opening position to open said third passage and to allow the air from the atmosphere or other air source to flow said fourth port via said first port.

2. A thermostatic valve as claimed in claim 1, wherein an upper housing to which said temperature detector is attached and provided at its side wall with a port for communication with atmosphere and with a valve seat surface in its lower surface is attached to the upper portion of a lower housing, said lower housing being provided in its side wall with a pipe for communication with said vacuum motor, a pipe for communication with the portion of said intake passage downstream from throttle valve of said carburetor and a pipe for communication with being said float chamber of said carburetor, said lower housing being further provided with a central partition having a central through bore, a valve seat surface formed in the lower surface thereof and a bore for communication with said pipe communicating with said float chamber and a bottom cover, said first valve element having a gasket attached to the peripheral portion of its upper surface, a flat portion formed in its upper surface and a lower projection, said first valve element being inserted into said central through bore of said central partition with a predetermined annular gap formed between the outer peripheral surface of said projection and inner peripheral surface of said central through bore, said first valve element being pressed against said valve seat surface by the force of a spring, while said second valve element being provided in its upper surface with a hole for receiving said projection of said first valve element and a gasket, and at its lower side with a partition having said check valve, said second valve element being pressed against said valve seat surface formed in the lower side of said central partition by the force of a spring, so as to be engaged by said first valve element.

3. A thermostatic valve as claimed in claim 2, wherein a hollow projection of said first valve element is provided in its side wall with an aperture, the annular gap around said projection being sealed by means of an "O" ring disposed in said central through bore of said lower housing.

4. A thermostatic valve as claimed in claim 2, wherein said second valve element is provided with an elongated frusto-conical projection formed on the upper surface thereof, said frusto-conical projection being adapted to be received by a recess formed in the lower side of said central partition wall.

5. In an internal combustion engine having:
a carburetor supplying an air fuel mixture to said engine through an intake pipe, said carburetor having a float chamber for storing fuel and a throttle valve for adjusting amount of air flow, and an air cleaner connected at the upstream side of said carburetor and supplying the air to said carburetor through a filter element, said air cleaner having an intake air passage to introduce the air from atmosphere, a temperature responsive system comprising:
a change-over valve for adjusting the introduction of warmed air;
a vacuum motor adapted for adjusting the temperature of intake air supplied to said carburetor, and
a thermostatic valve for adjusting the vacuum supplied to said vacuum motor in response to the temperature of said intake air while controlling additional air supplying to an intake pipe downstream from said throttle valve in response to the temperature of said intake air, said thermostatic valve comprising:
means for introducing the vacuum established at the portion of an intake passage downstream from said throttle valve into said vacuum motor when said engine operates with a light load at a low temperature of ambient air;
means for preventing the lowered vacuum in said intake passage from being transmitted to said vacuum motor when said engine operates with a heavy load at said low ambient air temperature with a supply of warmed air;
means for introducing atmospheric pressure to said vacuum motor and for introducing the atmosphere into said passage when said ambient air temperature is raised; and
means for introducing fuel vapor in the float chamber of said carburetor and air in said air cleaner into said intake air passage when said ambient air temperature is further raised.

6. In an internal combustion engine having:
a carburetor supplying an air fuel mixture to said engine through an intake pipe, said carburetor having a float chamber for storing fuel and a throttle valve for adjusting amount of air flow, an air cleaner connected at the upstream side of said carburetor and supplying the air to said carburetor through a filter element, said air cleaner having an intake air passage to introduce the air from atmosphere, a thermostatic valve containing a first valve chamber formed in a housing communicating with atmosphere, a thermally expandable member attached to said housing to detect the temperature of the intake air, and for expanding in response to a rise of the temperature of the intake air, and a first valve in said first valve chamber, to usually prevent communication between the atmosphere and said vacuum motor and to provide such communication in response to the expansion of said thermally expandable member, said thermostatic valve comprising:
- a second valve chamber for communicating with an intake passage downstream from said throttle valve of the engine, said float chamber of the carburetor and said first valve chamber, respectively;
- a second valve being disposed in said second valve chamber to usually prevent communication through said float chamber and to provide such communication in response to the expansion of said thermally expandable member;
- a check valve being attached to a passage communicating between said first valve member and said second valve member for permitting air flow toward from the first valve chamber to the second valve chamber and for preventing the air flow toward from the second valve chamber to the first air chamber.

* * * * *